United States Patent
Komuro

(10) Patent No.: US 11,035,464 B2
(45) Date of Patent: Jun. 15, 2021

(54) SHIFT CONTROL DEVICE

(71) Applicant: SUBARU CORPORATION, Tokyo (JP)

(72) Inventor: Masaki Komuro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/601,184

(22) Filed: Oct. 14, 2019

(65) Prior Publication Data

US 2020/0166128 A1 May 28, 2020

(30) Foreign Application Priority Data

Nov. 26, 2018 (JP) .............................. JP2018-220232

(51) Int. Cl.
*B60W 10/06* (2006.01)
*B60W 10/101* (2012.01)
(Continued)

(52) U.S. Cl.
CPC ........... *F16H 61/662* (2013.01); *B60W 10/06* (2013.01); *B60W 10/107* (2013.01); *B60W 30/19* (2013.01); *B60W 2540/10* (2013.01); *B60W 2710/0661* (2013.01); *B60W 2710/1005* (2013.01); *F16H 2061/66218* (2013.01)

(58) Field of Classification Search
CPC .......... F16H 59/18; F16H 61/04; F16H 61/66; F16H 61/662; F16H 2061/0477; F16H 2061/66218; B60W 10/06; B60W 10/101; B60W 10/107; B60W 30/182;
(Continued)

(56) References Cited

U.S. PATENT DOCUMENTS 5,577,980 A * 11/1996 Vukovich ............... F16H 61/06
477/144
2003/0203790 A1* 10/2003 Matsubara ............ F16H 61/143
477/107
(Continued)

FOREIGN PATENT DOCUMENTS

| JP | 2005-140174 A | 6/2005 |
|---|---|---|
| JP | 2014-88907 A | 5/2014 |
| JP | 2014-137096 A | 7/2017 |

*Primary Examiner* — Edwin A Young
(74) *Attorney, Agent, or Firm* — Troutman Pepper Hamilton Sanders LLP

(57) ABSTRACT

A shift control device has stepless and stepped shift modes in which a transmission gear ratio of a continuously variable transmission is controlled in stepless and stepwise fashions, respectively, and includes a shift controller that switches the shift mode to the stepless shift mode by executing shift control of the transmission if an accelerator-pedal operated amount falls below a switch threshold during the stepped shift mode, a minimum value detector that detects an operated-amount minimum value in a shift process of switching the shift mode to the stepless shift mode, and an upper-limit-value setting unit that sets an upper limit value for engine rotational acceleration based on a difference between the operated amount and the minimum value in the shift process. In the shift process, the shift controller limits the rotational acceleration to the upper limit value or lower by limiting a shift rate when the transmission is downshifted.

8 Claims, 14 Drawing Sheets

(51) Int. Cl.
  *F16H 61/662* (2006.01)
  *B60W 10/107* (2012.01)
  *B60W 30/19* (2012.01)
(58) Field of Classification Search
  CPC ............ B60W 30/19; B60W 2540/10; B60W 2540/103; B60W 2710/0661; B60W 2710/1005
  See application file for complete search history.

(56) References Cited

U.S. PATENT DOCUMENTS

| | | | |
|---|---|---|---|
| 2005/0096822 A1 | 5/2005 | Aoki | |
| 2006/0240942 A1* | 10/2006 | Kobayashi | F16H 61/66 477/44 |
| 2013/0165296 A1* | 6/2013 | Kabe | F16H 61/6648 477/37 |
| 2014/0200779 A1 | 7/2014 | Aoki | |
| 2018/0015928 A1* | 1/2018 | Koguchi | F16H 61/0213 |
| 2018/0245521 A1* | 8/2018 | Tsuge | F16H 61/0213 |

* cited by examiner

SHIFT CONTROL DEVICE

CROSS-REFERENCE TO RELATED APPLICATIONS

The present application claims priority from Japanese Patent Application No. 2018-220232 filed on Nov. 26, 2018, the entire contents of which are hereby incorporated by reference.

BACKGROUND

The disclosure relates to shift control devices that control continuously variable transmissions.

Continuously variable transmissions having, for example, primary pulleys and secondary pulleys are known as transmissions installed in automobiles. Shift modes of continuously variable transmissions include a stepless shift mode in which the transmission gear ratio is controlled in a stepless fashion and a stepped shift mode in which the transmission gear ratio is controlled in a stepwise fashion (see Japanese Unexamined Patent Application Publication Nos. 2014-088907, 2014-137096, and 2005-140174).

SUMMARY

An aspect of the disclosure provides a shift control device having a stepless shift mode and a stepped shift mode as shift modes for controlling a continuously variable transmission to be coupled to an engine. The stepless shift mode is a mode in which a transmission gear ratio of the continuously variable transmission is controlled in a stepless fashion. The stepped shift mode is a mode in which the transmission gear ratio of the continuously variable transmission is controlled in a stepwise fashion. The shift control device includes a shift controller, a minimum value detector, and an upper-limit-value setting unit. The shift controller is configured to switch the shift mode from the stepped shift mode to the stepless shift mode by executing shift control of the continuously variable transmission if an accelerator-pedal operated amount falls below a switch threshold during the stepped shift mode. The minimum value detector is configured to detect a minimum value of the accelerator-pedal operated amount in a shift process of switching the shift mode from the stepped shift mode to the stepless shift mode. The upper-limit-value setting unit is configured to set an upper limit value for rotational acceleration of the engine based on a difference between the accelerator-pedal operated amount and the minimum value in the shift process of switching the shift mode from the stepped shift mode to the stepless shift mode. In the shift process of switching the shift mode from the stepped shift mode to the stepless shift mode, the shift controller limits the rotational acceleration of the engine to the upper limit value or lower by limiting a shift rate when the continuously variable transmission is downshifted.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
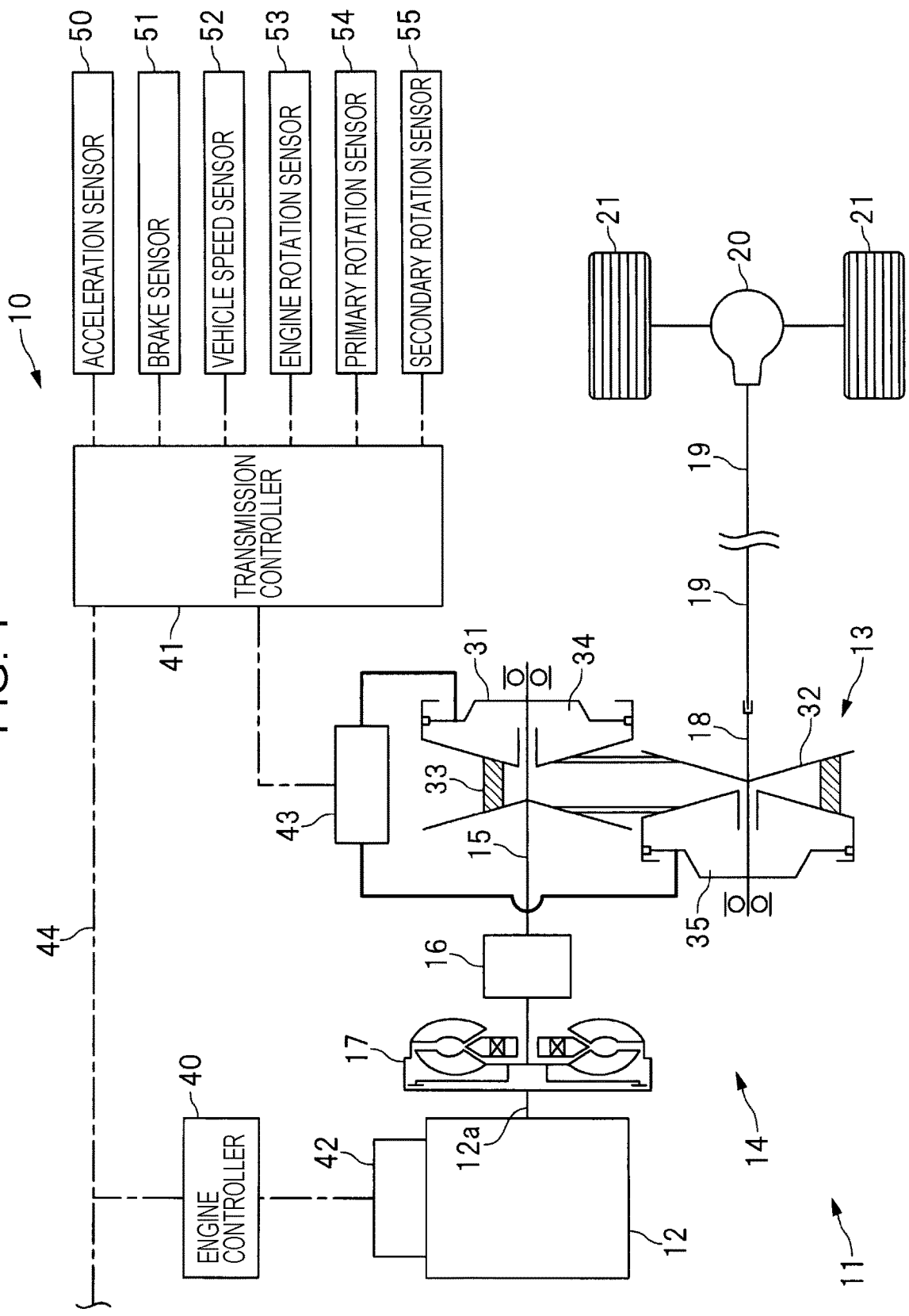
FIG. 1 schematically illustrates a vehicle equipped with a shift control device according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

An embodiment of the disclosure will now be described in detail below with reference to the drawings.

For example, when the accelerator pedal is released from the pressed state in the stepped shift mode, the shift mode is switched from the stepped shift mode to the stepless shift mode. In the stepless shift mode, the target transmission gear ratio is often set to be lower than that in the stepped shift mode, that is, the target engine rotation speed is set to be higher than that in the stepped shift mode. Therefore, when the shift mode is to be switched from the stepped shift mode to the stepless shift mode, the engine rotation speed may rapidly increase in accordance with downshifting of the continuously variable transmission.

However, since a situation where the shift mode is switched to the stepless shift mode is a situation where the pressed state of the accelerator pedal is eased, a rapid increase in the engine rotation speed may give a sense of discomfort to the vehicle occupant or occupants. Therefore, in order not to give a sense of discomfort to the vehicle occupant or occupants, appropriate switching between the shift modes is desired.

It is desirable to appropriately switch between the shift modes.

[Vehicle Structure]

FIG. 1 schematically illustrates a vehicle 11 equipped with a shift control device 10 according to an embodiment of the disclosure. As illustrated in FIG. 1, the vehicle 11 is equipped with a power train 14 provided with an engine 12 and a continuously variable transmission 13. A primary shaft 15 as an input shaft of the continuously variable transmission 13 is coupled to the engine 12 via an advance-retract switching mechanism 16 and a torque converter 17. A secondary shaft 18 as an output shaft of the continuously variable transmission 13 is coupled to wheels 21 via, for example, a driving-wheel output shaft 19 and a differential mechanism 20. The advance-retract switching mechanism 16 for switching the rotational direction of the primary shaft 15 includes, for example, a clutch and a planetary pinion train (not illustrated).

The continuously variable transmission 13 has a primary pulley 31 provided on the primary shaft 15, a secondary pulley 32 provided on the secondary shaft 18, and a driving chain 33 wound around these pulleys 31 and 32. The primary pulley 31 is provided with a primary chamber 34, and the secondary pulley 32 is provided with a secondary chamber 35. By controlling the oil pressure supplied to the primary chamber 34 and the secondary chamber 35, the groove widths of the primary pulley 31 and the secondary pulley 32 can be adjusted. Accordingly, the diameter of the driving chain 33 wound around the pulleys 31 and 32 can be changed, so that the transmission gear ratio of the continuously variable transmission 13 can be controlled.

[Control System]

A control system of the power train 14 will now be described. As illustrated in FIG. 1, the vehicle 11 is provided with an engine controller 40 and a transmission controller 41 that are constituted of, for example, microcomputers. The engine controller 40 outputs a control signal to an engine auxiliary unit 42, such as an injector, an igniter, and a throttle valve, to control the running mode of the engine 12. The transmission controller 41 outputs a control signal to a valve unit 43, constituted of a plurality of electromagnetic valves and oil passages, to control the operational modes of, for example, the continuously variable transmission 13, the advance-retract switching mechanism 16, and the torque converter 17. Hydraulic oil discharged from an oil pump (not illustrated) is pressure-controlled via the valve unit 43 and is subsequently supplied to oil chambers included in, for example, the continuously variable transmission 13 and the torque converter 17.

These controllers 40 and 41 are coupled to each other in a communicable manner via an in-vehicle network 44, such as either one of a controller area network (CAN) and a local interconnect network (LIN). The transmission controller 41 is coupled to an acceleration sensor 50 that detects an accelerator-pedal operated amount (referred to as "accelerator opening AP" hereinafter) indicating an amount by which the accelerator pedal is pressed, a brake sensor 51 that detects a brake-pedal operated amount indicating an amount by which the brake pedal is pressed, and a vehicle speed sensor 52 that detects a vehicle speed VSP indicating the traveling speed of the vehicle 11. Furthermore, the transmission controller 41 is coupled to, for example, an engine rotation sensor 53 that detects an engine rotation speed (referred to as "engine rotation speed Ne" hereinafter) as a rotation speed of a crankshaft 12a, a primary rotation sensor 54 that detects a primary rotation speed as a rotation speed of the primary pulley 31, and a secondary rotation sensor 55 that detects a secondary rotation speed as a rotation speed of the secondary pulley 32.

[Shift Control of Continuously Variable Transmission]

Figure 2:
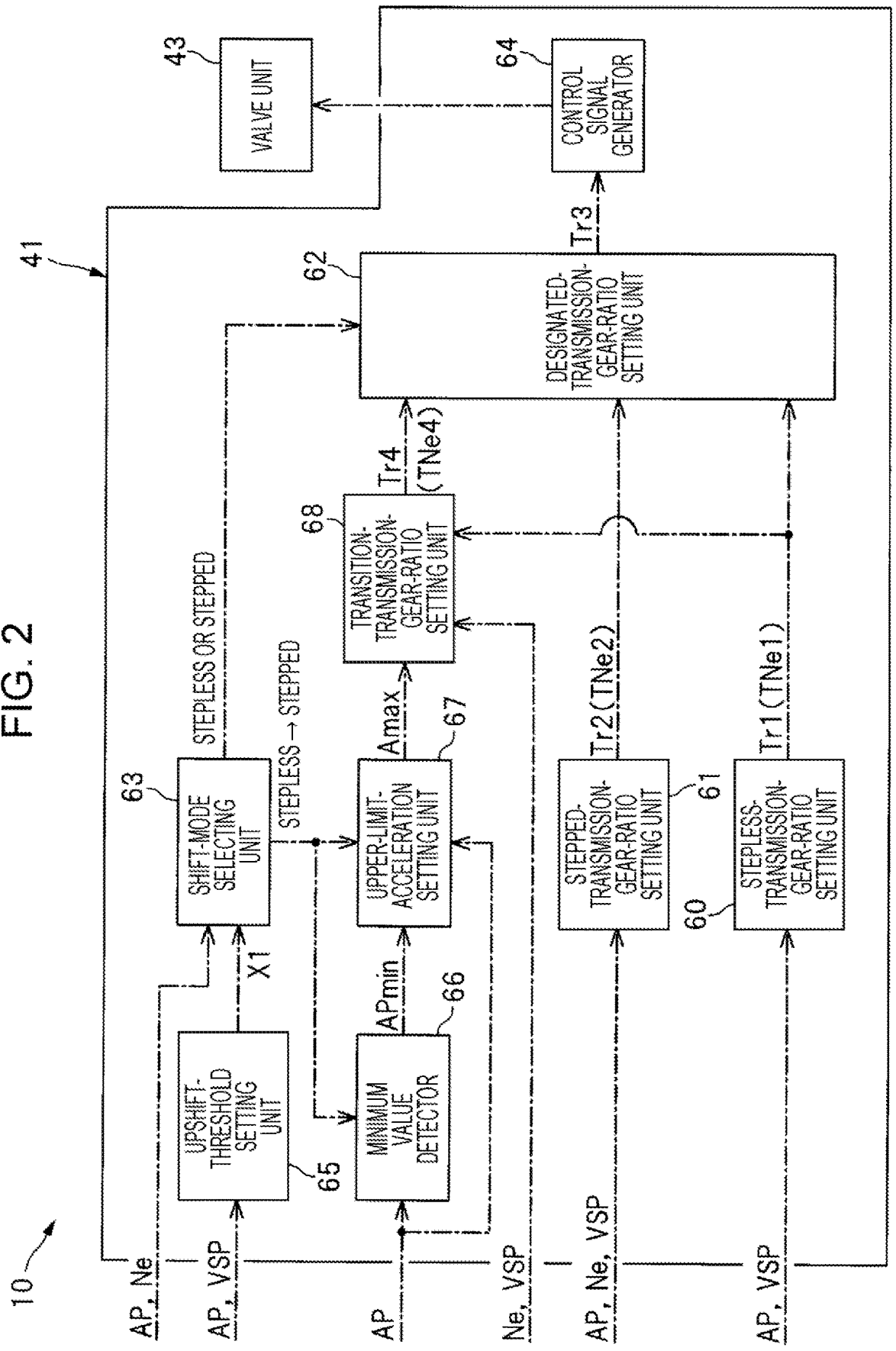
FIG. 2 is a block diagram illustrating a configuration example of a transmission controller.
Figure 3:
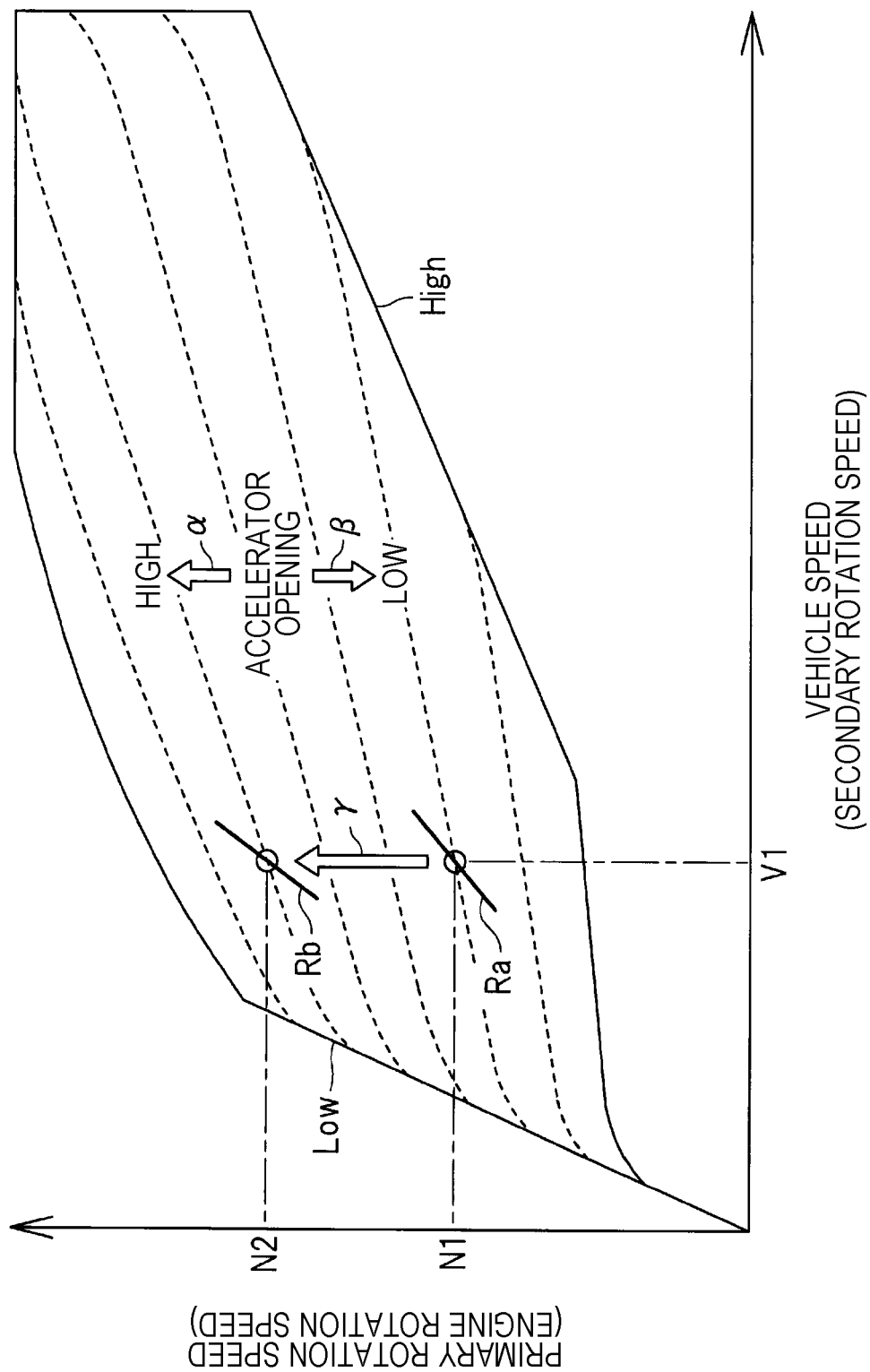
FIG. 3 illustrates an example of a shift situation when a stepless shift mode is used.
Figure 4:
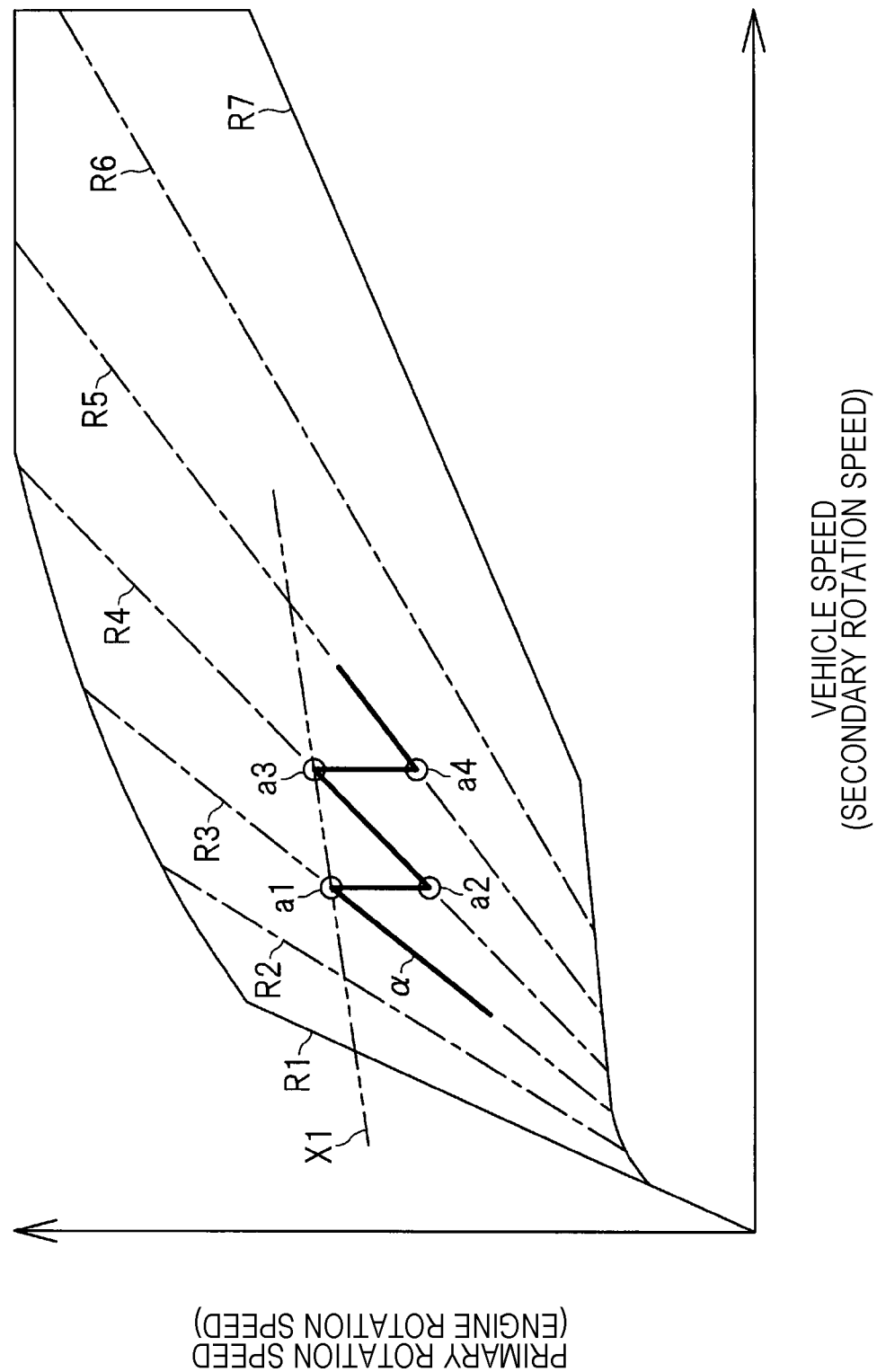
FIG. 4 illustrates an example of a shift situation when a stepped shift mode is used.

The shift control of the continuously variable transmission 13 will now be described. FIG. 2 is a block diagram illustrating a configuration example of the transmission controller 41. FIG. 3 illustrates an example of a shift situation when the stepless shift mode is used. FIG. 4 illustrates an example of a shift situation when the stepped shift mode is used.

As shift modes of the continuously variable transmission 13, the shift control device 10 has a stepless shift mode in which the transmission gear ratio is controlled in a stepless fashion and a stepped shift mode in which the transmission gear ratio is controlled in a stepwise fashion. Thus, as illustrated in FIG. 2, the transmission controller 41 has a stepless-transmission-gear-ratio setting unit 60 that sets a target transmission gear ratio Tr1 to be used in the stepless shift mode and a stepped-transmission-gear-ratio setting unit 61 that sets a target transmission gear ratio Tr2 to be used in the stepped shift mode.

The stepless-transmission-gear-ratio setting unit 60 refers to a shift characteristic map based on the accelerator opening AP and the vehicle speed VSP and sets the target transmission gear ratio Tr1 to be used in the stepless shift mode. As illustrated in FIG. 3, a characteristic line Low indicating a lower-side maximum transmission gear ratio and a characteristic line High indicating a higher-side minimum transmission gear ratio are set in the shift characteristic map. Furthermore, as indicated by dashed lines, a plurality of characteristic lines corresponding to the accelerator opening AP are set in the shift characteristic map. As the accelerator opening AP increases, that is, as the requested driving force with respect to the vehicle 11 increases, a characteristic line in the direction of an arrow α is selected. On the other hand, as the accelerator opening AP decreases, that is, as the requested driving force with respect to the vehicle 11 decreases, a characteristic line in the direction of an arrow β is selected. For example, as indicated by an arrow 7, if the accelerator pedal is pressed while the vehicle 11 is traveling at a vehicle speed V1, the target primary rotation speed is increased from N1 to N2 as a result of selection of a new characteristic line, and the target transmission gear ratio Tr1 is continuously controlled from "Ra" to "Rb" at the lower side. Accordingly, in the stepless shift mode, the target transmission gear ratio Tr1 is updated while changing in a continuous fashion, that is, in a stepless fashion.

The stepped-transmission-gear-ratio setting unit 61 refers to the shift characteristic map (not illustrated) based on the accelerator opening AP and the vehicle speed VSP and sets the target transmission gear ratio Tr2 to be used in the stepped shift mode. As illustrated in FIG. 4, for example, seven fixed transmission gear ratios R1 to R7 are each set in advance as the target transmission gear ratio Tr2 in the stepped shift mode. As indicated by a thick line a in FIG. 4, when the engine rotation speed Ne reaches an upshift threshold X1 (reference sign a1), to be described later, during acceleration using the third fixed transmission gear ratio R3, the target transmission gear ratio Tr2 is switched to the fourth fixed transmission gear ratio R4 (reference sign a2). Subsequently, when the engine rotation speed Ne reaches the upshift threshold X1 (reference sign a3) during acceleration using the fourth fixed transmission gear ratio R4, the target transmission gear ratio Tr2 is switched to the fifth fixed transmission gear ratio R5 (reference sign a4). Accordingly, in the stepped shift mode, the target transmission gear ratio Tr2 is selected from the fixed transmission gear ratios R1 to R7, such that the target transmission gear ratio Tr2 is switched in a stepwise fashion.

As illustrated in FIG. 2, the transmission controller 41 has a designated-transmission-gear-ratio setting unit 62 that sets a designated transmission gear ratio Tr3 and a shift-mode selecting unit 63 that selects either one of the stepless shift mode and the stepped shift mode as the shift mode. As will be described later, the shift-mode selecting unit 63 selects the shift mode (i.e., either one of the stepless shift mode and the stepped shift mode) based on, for example, the accelerator opening AP, and outputs the selected shift mode to the designated-transmission-gear-ratio setting unit 62. Then, the designated-transmission-gear-ratio setting unit 62 sets the designated transmission gear ratio Tr3 as the ultimate control target based on the selection result of the shift mode.

In one example, when the stepless shift mode is selected as the shift mode, the designated-transmission-gear-ratio setting unit 62 sets the target transmission gear ratio Tr1 from the stepless-transmission-gear-ratio setting unit 60 as the designated transmission gear ratio Tr3. On the other hand, when the stepped shift mode is selected as the shift mode, the designated-transmission-gear-ratio setting unit 62 sets the target transmission gear ratio Tr2 from the stepped-transmission-gear-ratio setting unit 61 as the designated transmission gear ratio Tr3. Then, a control signal generator 64 coupled to the designated-transmission-gear-ratio setting unit 62 generates a control signal based on the designated transmission gear ratio Tr3 and outputs this control signal to the valve unit 43. The valve unit 43 adjusts the pressure of hydraulic oil supplied to the primary chamber 34 and the secondary chamber 35, and controls the transmission gear ratio of the continuously variable transmission 13 toward the designated transmission gear ratio Tr3. As will be described later, in a transition process of switching from the stepped shift mode to the stepless shift mode, a target transmission gear ratio Tr4 is transmitted from the transition-transmission-gear-ratio setting unit 68 to the designated-transmission-gear-ratio setting unit 62. In this case, the designated-transmission-gear-ratio setting unit 62 sets the target transmission gear ratio Tr4 as the designated transmission gear ratio Tr3.

[Shift-Mode Switching Control]

Figure 5:
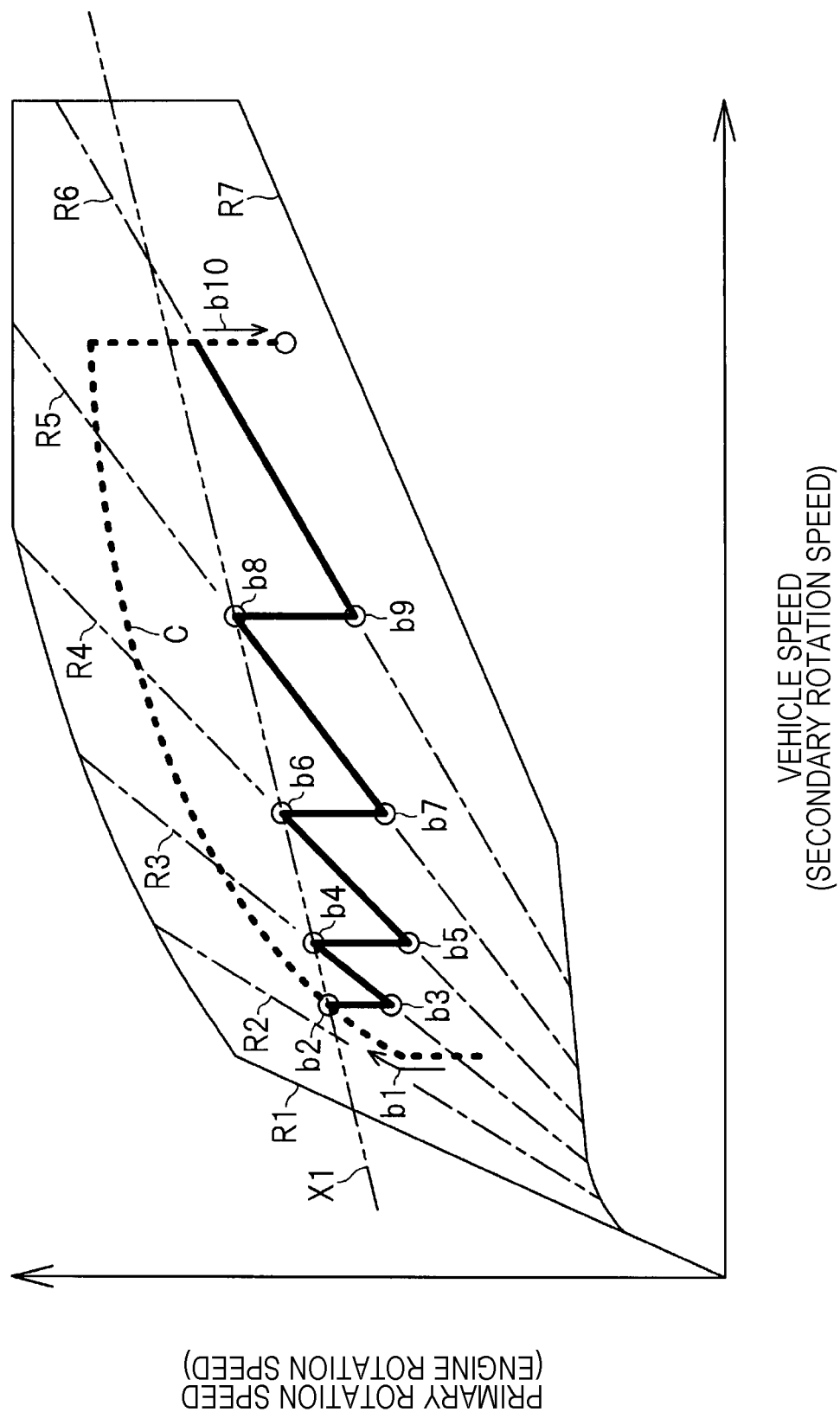
FIG. 5 illustrates an example of a shift situation involving switching of shift modes.
Figure 6:
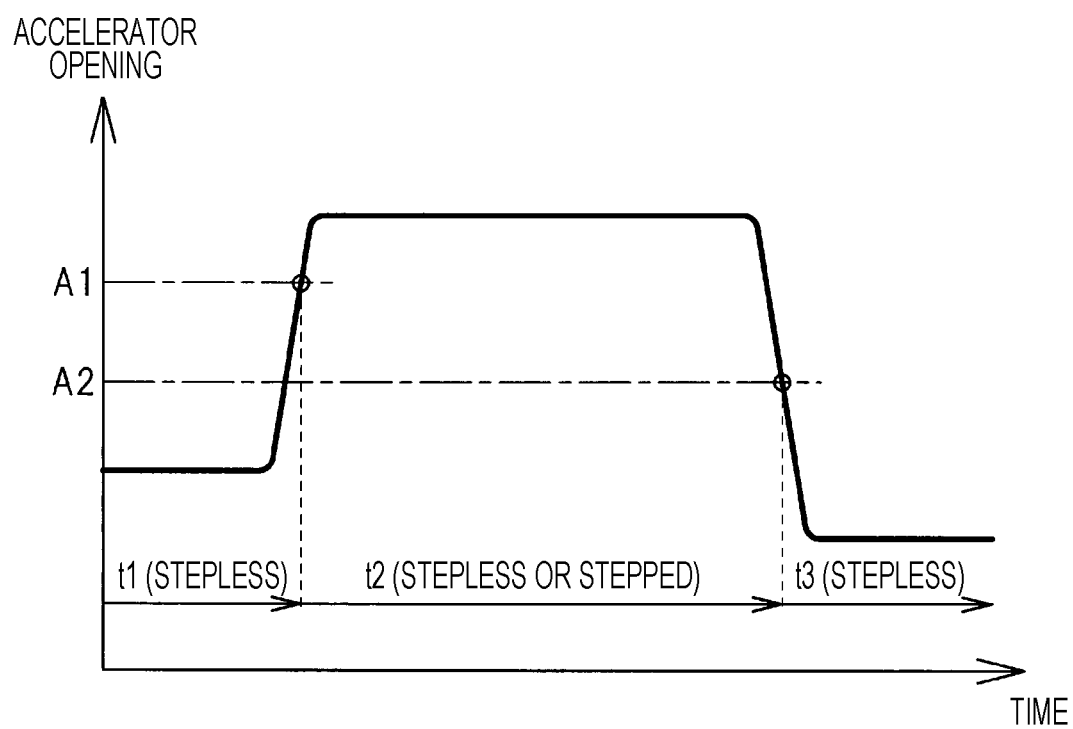
FIG. 6 illustrates an example where an accelerator pedal is operated in the shift situation illustrated in FIG. 5.

The following description relates to switching between the shift modes performed by the transmission controller 41. FIG. 5 illustrates an example of a shift situation involving switching of shift modes. In FIG. 5, the shift situation according to the stepless shift mode is indicated by a dashed line, and the shift situation according to the stepped shift mode is indicated by a solid line. FIG. 6 illustrates an example where the accelerator pedal is operated in the shift situation illustrated in FIG. 5.

As mentioned above, the shift-mode selecting unit 63 of the transmission controller 41 selects either one of the stepless shift mode and the stepped shift mode as a shift mode to be executed based on, for example, the accelerator opening AP. A condition for switching the shift mode from the stepless shift mode to the stepped shift mode is a condition in which the accelerator opening AP exceeds a predetermined opening threshold A1 and the engine rotation speed Ne exceeds a predetermined upshift threshold X1. In one example, if the accelerator pedal is pressed deeply in the stepless shift mode, the shift mode is switched from the stepless shift mode to the stepped shift mode. A condition for switching the shift mode from the stepped shift mode to the stepless shift mode is a condition in which the accelerator opening AP falls below an opening threshold (switch threshold) A2 that is lower than the opening threshold A1. In one example, if the accelerator pedal is released from the pressed state in the stepped shift mode, the shift mode is switched from the stepped shift mode to the stepless shift mode.

In one example, as indicated by a reference sign t1 in FIG. 6, the stepless shift mode is selected as the shift mode until the accelerator opening AP reaches the opening threshold A1. Furthermore, as indicated by a reference sign t2, until the accelerator opening AP falls below the opening threshold A2 from when the accelerator opening AP exceeds the opening threshold A1, if the engine rotation speed Ne reaches the upshift threshold X1, as will be described later, the shift mode is switched from the stepless shift mode to the stepped shift mode. Moreover, as indicated by a reference sign t3, when the accelerator opening AP falls below the opening threshold A2, the stepless shift mode is selected as the shift mode.

As indicated by an arrow b1 in FIG. 5, when the accelerator pedal is pressed deeply in the stepless shift mode, so-called kick-down control is executed for quickly accelerating the vehicle 11, so that the target transmission gear ratio Tr1 is quickly controlled toward the lower side and the engine rotation speed Ne is quickly increased. In this case, a situation where the accelerator pedal is operated is a situation where the accelerator pedal is pressed by the vehicle occupant and the accelerator opening AP exceeds the opening threshold A1. Subsequently, when the engine rotation speed Ne reaches the predetermined upshift threshold X1 (reference sign b2), the condition for switching the shift mode to the stepped shift mode is satisfied, so that the shift mode is switched from the stepless shift mode to the stepped shift mode and upshifting to the third fixed transmission gear ratio R3 as a closest fixed transmission gear ratio is performed (reference sign b3).

In subsequent acceleration, every time the engine rotation speed Ne reaches the upshift threshold X1 (reference signs b4, b6, and b8), to be described later, the continuously variable transmission 13 is upshifted to the higher fixed transmission gear ratios R4 to R6 (reference signs b5, b7, and b9). Then, when the accelerator pedal is released from the pressed state, the condition for switching the shift mode to the stepless shift mode is satisfied, so that the shift mode is switched from the stepped shift mode to the stepless shift mode, as indicated by an arrow b10, whereby the transmission gear ratio is controlled toward the higher side and the engine rotation speed Ne is gradually decreased.

Figure 7:
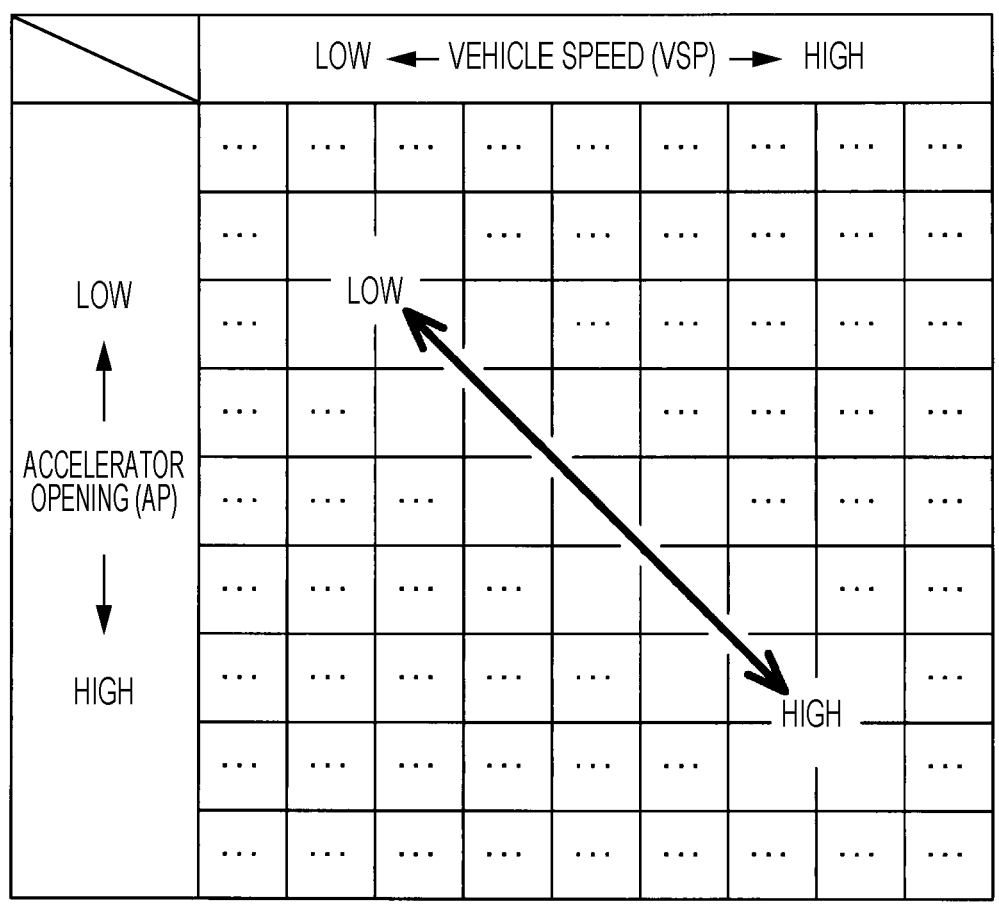
FIG. 7 illustrates an example of an upshift threshold.

The upshift threshold X1 illustrated in FIG. 5 is set by the upshift-threshold setting unit 65 of the transmission controller 41 based on the accelerator opening AP and the vehicle speed VSP. FIG. 7 illustrates an example of the upshift threshold X1. As illustrated in FIG. 7, the upshift threshold X1 is set to a lower value as the accelerator opening AP decreases, whereas the upshift threshold X1 is set to a higher value as the accelerator opening AP increases. Moreover, the upshift threshold X1 is set to a lower value as the vehicle speed VSP decreases, whereas the upshift threshold X1 is set to a higher value as the vehicle speed VSP increases. By setting the upshift threshold X1 in this manner, upshifting can be suppressed in regions where the accelerator opening AP and the vehicle speed VSP are high, so that the driving force when the vehicle 11 is accelerated in the stepped shift mode can be ensured.

As described above, when the accelerator pedal is deeply pressed during the stepless shift mode, the shift mode is switched from the stepless shift mode to the stepped shift mode. Accordingly, when the vehicle 11 is to be accelerated, the manners in which the engine rotation speed and the vehicle speed are increased can be made proportional to each other, so that the vehicle 11 can be accelerated without giving a sense of discomfort to the vehicle occupant or occupants. Furthermore, as indicated by a dashed line C in FIG. 5, if the vehicle 11 is accelerated while the stepless shift mode is maintained, the engine rotation speed tends to remain high. However, by switching the shift mode from the stepless shift mode to the stepped shift mode, the vehicle 11 can be accelerated while decreasing the engine rotation speed. By decreasing the engine rotation speed in this manner, noise and loss of the power train 14 can be reduced.

[Switching Control from Stepped Shift Mode to Stepless Shift Mode]

Figure 8:
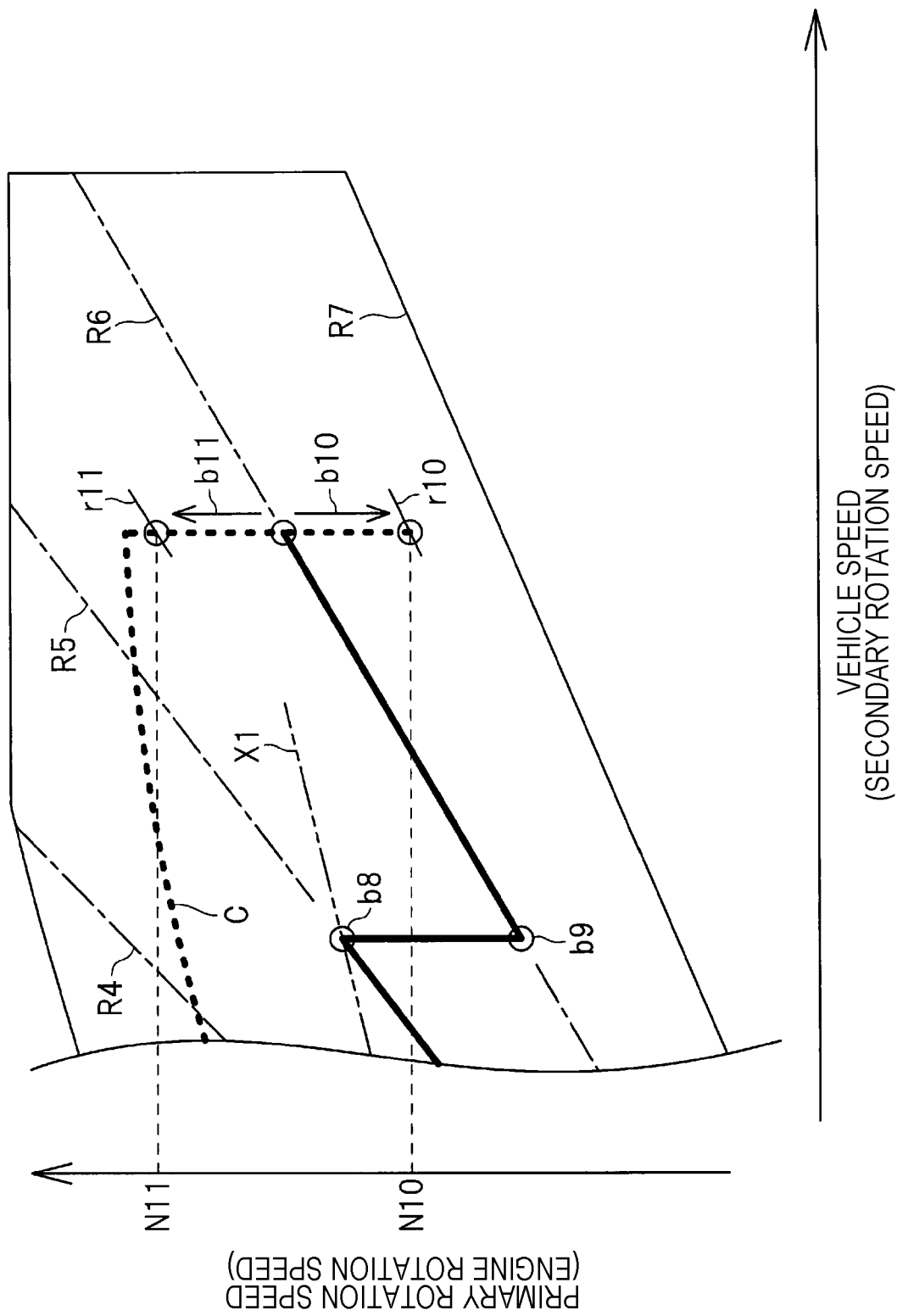
FIG. 8 illustrates a transition of an engine rotation speed when the shift mode is switched from the stepped shift mode to the stepless shift mode.

Next, switching control from the stepped shift mode to the stepless shift mode will be described. FIG. 8 illustrates a transition of the engine rotation speed when the shift mode is switched from the stepped shift mode to the stepless shift mode. As mentioned above, when the accelerator opening AP falls below the opening threshold A2 during the stepped shift mode, the shift mode is switched from the stepped shift mode to the stepless shift mode. As indicated by a dashed line C in FIG. 5, the target transmission gear ratio in the stepless shift mode is set to be lower than that in the stepped shift mode. In one example, in the stepless shift mode, the target engine rotation speed is set to be higher than that in the stepped shift mode. Therefore, as indicated by an arrow b11 in FIG. 8, depending on the magnitude of the accelerator opening AP, the engine rotation speed Ne may possibly increase rapidly in the shift process of switching the shift mode from the stepped shift mode to the stepless shift mode.

In one example, if the pressed state of the accelerator pedal is released and the accelerator opening AP has significantly decreased when the accelerator opening AP falls below the opening threshold A2, the target transmission gear ratio in the stepless shift mode is set to "r10" at the higher side, and the target engine rotation speed in the stepless shift mode is set to "N10". In this case, as indicated by an arrow b10, the engine rotation speed Ne decreases rapidly. On the other hand, if the pressed state of the accelerator pedal is maintained and the accelerator opening AP is kept near the opening threshold A2 when the accelerator opening AP falls below the opening threshold A2, the target transmission gear ratio in the stepless shift mode is set to "r11" at the lower side, and the target engine rotation speed in the stepless shift mode is set to "N11". In this case, as indicated by an arrow b11, the engine rotation speed Ne may possibly increase rapidly. When the shift mode is switched from the stepped shift mode to the stepless shift mode in this manner, that is, when the pressed state of the accelerator pedal is eased, a rapid increase in the engine rotation speed Ne may give a sense of discomfort to the vehicle occupant or occupants.

As will be described later, in the shift process (referred to as "transition process" hereinafter) of switching the shift mode from the stepped shift mode to the stepless shift mode, the transmission controller 41 controls the continuously variable transmission 13 based on the target transmission gear ratio Tr4, so that the engine rotation speed Ne increasing in accordance with downshifting is limited based on upper limit acceleration Amax. Thus, as illustrated in FIG. 2, the transmission controller 41 has a minimum value detector 66 that detects a minimum value APmin of the accelerator opening AP, an upper-limit-acceleration setting unit (upper-limit-value setting unit) 67 that sets the upper limit acceleration Amax of the engine rotation speed Ne, and a transition-transmission-gear-ratio setting unit (shift controller) 68 that sets the target transmission gear ratio Tr4 to be used in the transition process to the stepless shift mode. The upper limit acceleration Amax of the engine rotation speed Ne is an upper limit value for the increasing rate of the engine rotation speed Ne, that is, an upper limit value for the rotational acceleration of the engine 12 (i.e., the crankshaft 12a).

[Switching Control to Stepless Shift Mode: Flowchart]

Figure 9:
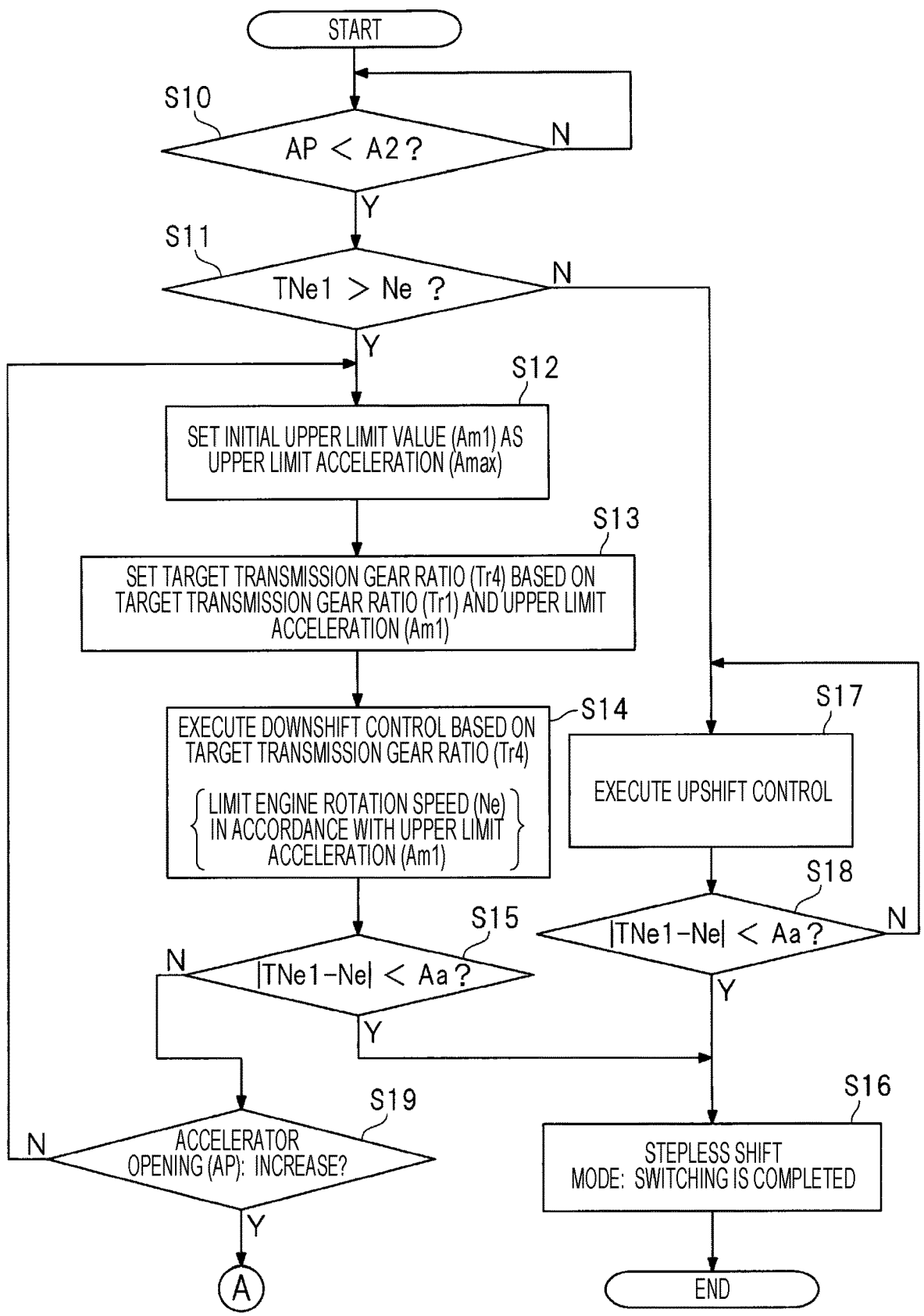
FIG. 9 is a flowchart illustrating an example of a process for switching the shift mode from the stepped shift mode to the stepless shift mode.
Figure 10:
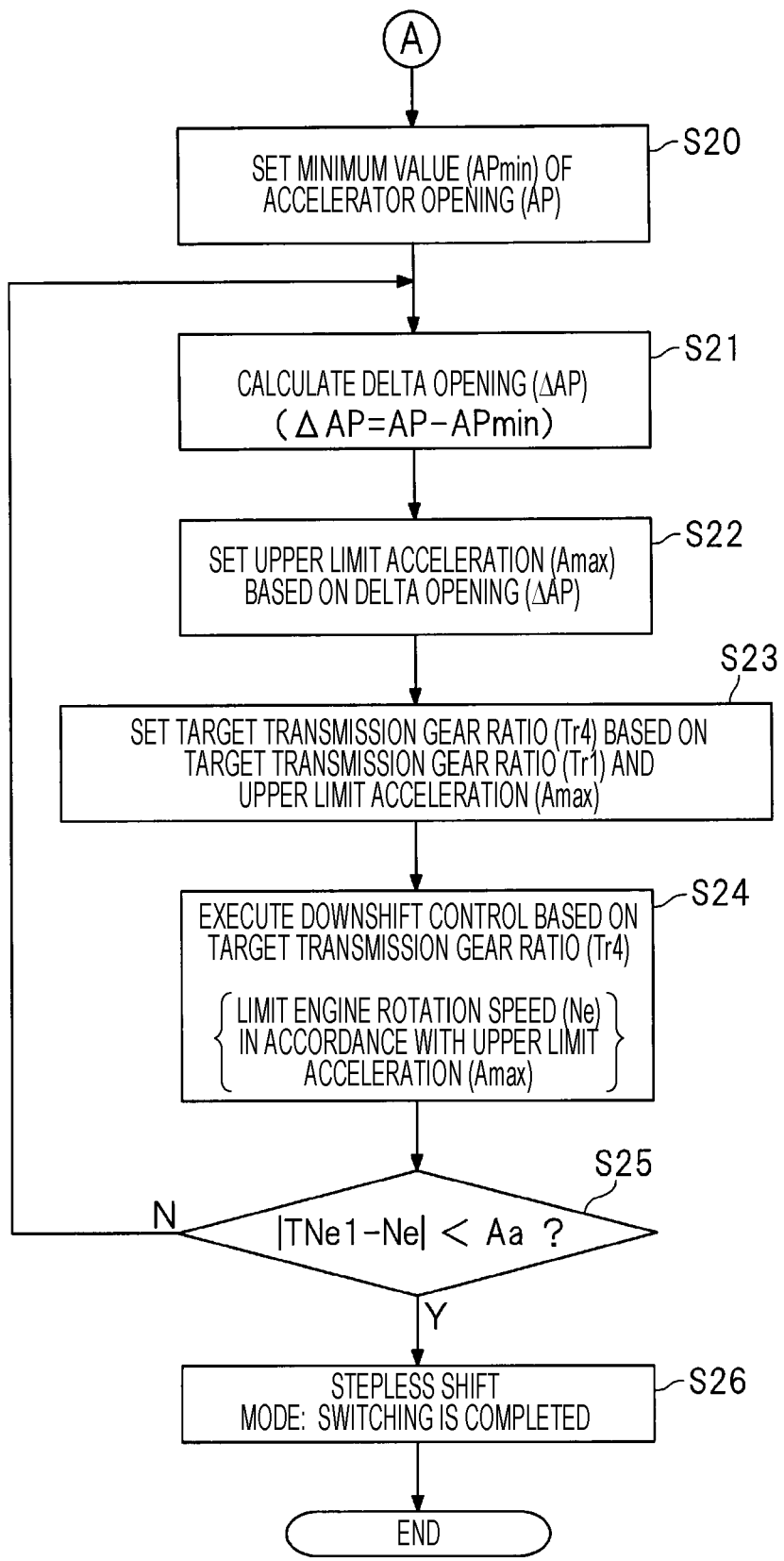
FIG. 10 is another flowchart illustrating the example of the process for switching the shift mode from the stepped shift mode to the stepless shift mode.

The switching process from the stepped shift mode to the stepless shift mode performed by the transmission controller 41 will be described below. FIG. 9 and FIG. 10 are flowcharts illustrating an example of the switching process from the stepped shift mode to the stepless shift mode. The flowcharts illustrated in FIG. 9 and FIG. 10 are executed during the stepped shift mode and are connected at the part indicated by a reference sign A.

As illustrated in FIG. 9 and FIG. 10, in step S10, it is determined whether the accelerator opening AP falls below the opening threshold A2. If it is determined in step S10 that the accelerator opening AP falls below the opening threshold A2, that is, if it is determined that the condition for switching the shift mode from the stepped shift mode to the stepless shift mode is satisfied, the process proceeds to step S11 where it is determined whether a target engine rotation speed TNe1 in the stepless shift mode exceeds the current engine rotation speed Ne.

If the current engine rotation speed Ne exceeds the target engine rotation speed TNe1 in the stepless shift mode in step S11, that is, if the engine rotation speed Ne increases in accordance with downshifting of the continuously variable transmission 13 when the shift mode is switched from the stepped shift mode to the stepless shift mode, the process proceeds to step S12 where a predetermined initial upper limit value Am1 is set as the upper limit acceleration Amax of the engine rotation speed Ne. Then, the process proceeds to step S13 where the target transmission gear ratio Tr4 to be used in the transition process to the stepless shift mode is set based on the target transmission gear ratio Tr1 in the stepless shift mode and the upper limit acceleration Amax. In step S13, the target transmission gear ratio Tr4 of the continuously variable transmission 13 is set such that the engine acceleration of the engine 12 is limited to the upper limit acceleration Amax or lower (i.e., the initial upper limit value Am1 or lower) when the engine rotation speed Ne increases in accordance with downshifting in the transition process.

Subsequently, the process proceeds to step S14 where downshift control of the continuously variable transmission 13 is executed based on the target transmission gear ratio Tr4. In step S15, it is determined whether a rotation speed difference between the target engine rotation speed TNe1 in the stepless shift mode and the current engine rotation speed Ne is within a predetermined range Aa. If the rotation speed difference between the target engine rotation speed TNe1 and the engine rotation speed Ne is within the predetermined range Aa in step S15, that is, if the engine rotation speed Ne has converged on the target engine rotation speed TNe1, the process proceeds to step S16 where it is determined that the switching to the stepless shift mode has been completed. Then, the process exits the routine.

Accordingly, in the transition process from the stepped shift mode to the stepless shift mode, the continuously variable transmission 13 is controlled in accordance with the target transmission gear ratio Tr4, so that the shift rate when the continuously variable transmission 13 is downshifted is limited, and the rotational acceleration of the engine 12 is limited to the upper limit acceleration Amax or lower. Consequently, in the transition process to the stepless shift mode, a rapid increase in the engine rotation speed Ne can be avoided, thereby allowing for appropriate switching between the shift modes without giving a sense of discomfort to the vehicle occupant or occupants.

If the current engine rotation speed Ne falls below the target engine rotation speed TNe1 in the stepless shift mode in step S11, the process proceeds to step S17 where upshift control of the continuously variable transmission 13 is executed. In step S18, it is determined whether the rotation speed difference between the target engine rotation speed TNe1 in the stepless shift mode and the current engine rotation speed Ne is within the predetermined range Aa. If the rotation speed difference between the target engine rotation speed TNe1 and the current engine rotation speed Ne is within the predetermined range Aa in step S18, that is, if the engine rotation speed Ne has converged on the target engine rotation speed TNe1, the process proceeds to step S16 where it is determined that the switching to the stepless shift mode has been completed. Then, the process exits the routine.

If the rotation speed difference between the target engine rotation speed TNe1 and the current engine rotation speed Ne exceeds the predetermined range Aa in step S15 described above, that is, if the engine rotation speed Ne has not converged on the target engine rotation speed TNe1, the process proceeds to step S19 where it is determined whether the accelerator opening AP has changed from decreasing to increasing. If it is determined in step S19 that the accelerator opening AP has not changed to increasing, the downshift control of the continuously variable transmission 13 is continued while the initial upper limit value Am1 is maintained as the upper limit acceleration Amax in the steps from step S12.

On the other hand, if it is determined in step S19 that the accelerator opening AP has changed from decreasing to increasing, the process proceeds to step S20 where the minimum value APmin of the accelerator opening AP is set. The minimum value APmin is a value of the accelerator opening AP when the accelerator opening AP changes from decreasing to increasing. In other words, if the accelerator pedal is pressed again by the vehicle occupant from when the switching to the stepless shift mode is confirmed, the accelerator opening AP at the point when the pressing of the accelerator pedal is commenced is set as the minimum value APmin.

Figure 11A:
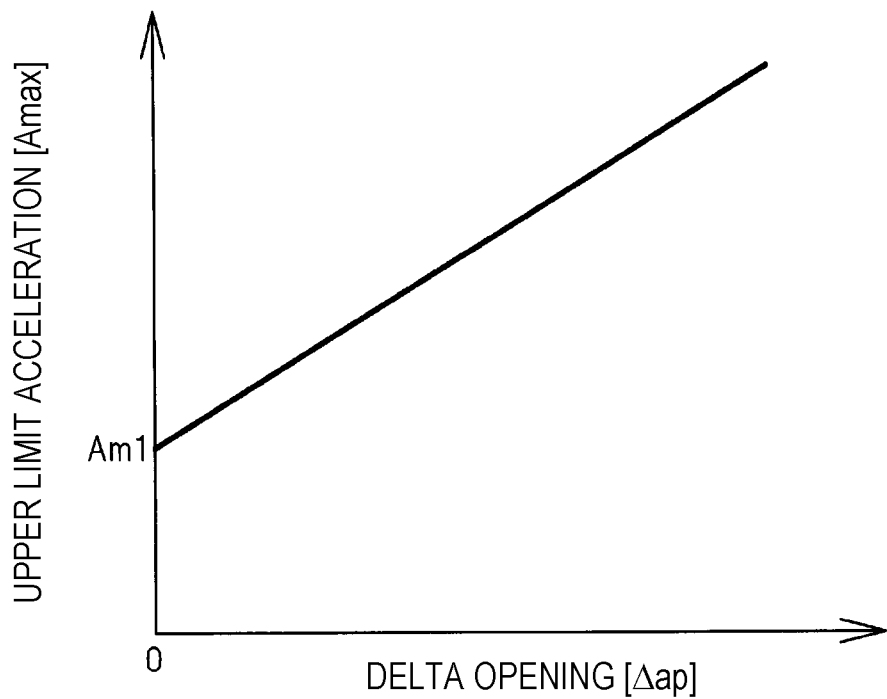
FIG. 11A and FIG. 11B are diagrams illustrating an example of upper limit acceleration set based on a delta opening.
Figure 11B:
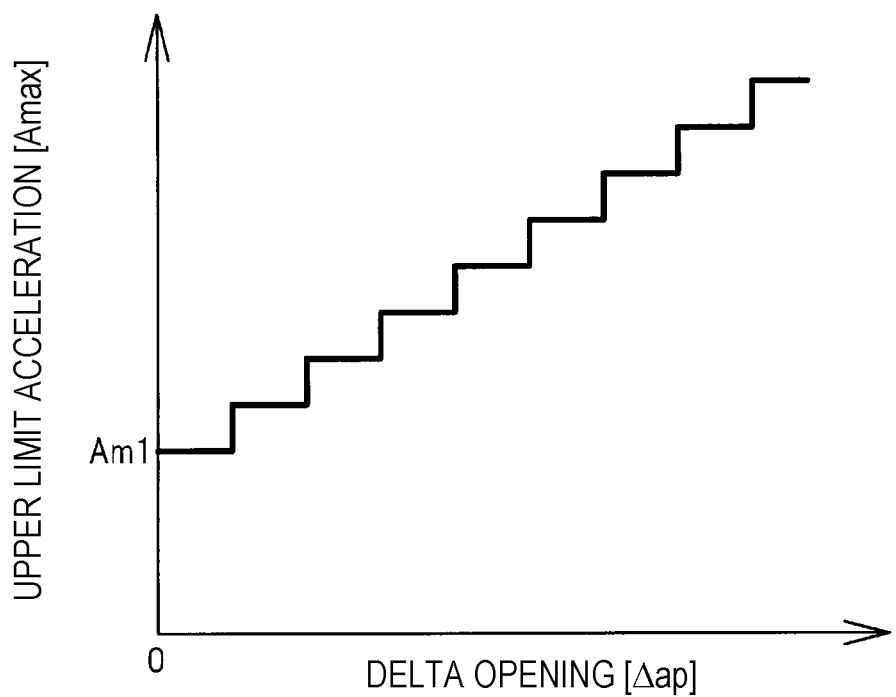

When the minimum value APmin is set in step S20 in this manner, the process proceeds to step S21 where a delta opening (difference) ΔAP is calculated by subtracting the minimum value APmin from the current accelerator opening AP. In step S22, the upper limit acceleration Amax of the engine rotation speed Ne is set based on the delta opening ΔAP. FIG. 11A and FIG. 11B are diagrams illustrating an example of the upper limit acceleration Amax set based on the delta opening ΔAP. As illustrated in FIG. 11A and FIG. 11B, the upper limit acceleration Amax is set to a higher value as the delta opening ΔAP increases. In one example, the upper limit acceleration Amax is set to a higher value as the accelerator pedal is pressed more deeply. The upper limit acceleration Amax may change in a continuous fashion, as illustrated in FIG. 11A, or the upper limit acceleration Amax may change in a stepwise fashion, as illustrated in FIG. 11B.

Subsequently, the process proceeds to step S23 where the target transmission gear ratio Tr4 to be used in the transition process to the stepless shift mode is set based on the target transmission gear ratio Tr1 in the stepless shift mode and the upper limit acceleration Amax. In step S23, the target transmission gear ratio Tr4 of the continuously variable transmission 13 is set such that the rotational acceleration of the engine 12 is limited to the upper limit acceleration Amax or lower when the engine rotation speed Ne increases in accordance with downshifting in the transition process.

Subsequently, the process proceeds to step S24 where downshift control of the continuously variable transmission 13 is executed based on the target transmission gear ratio Tr4. In step S25, it is determined whether the rotation speed difference between the target engine rotation speed TNe1 in the stepless shift mode and the current engine rotation speed Ne is within the predetermined range Aa. If the rotation speed difference between the target engine rotation speed TNe1 and the engine rotation speed Ne is within the predetermined range Aa in step S25, that is, if the engine rotation speed Ne has converged on the target engine rotation speed TNe1, the process proceeds to step S26 where it is determined that the switching to the stepless shift mode has been completed. Then, the process exits the routine.

On the other hand, if the rotation speed difference between the target engine rotation speed TNe1 and the current engine rotation speed Ne exceeds the predetermined range Aa in step S25 described above, that is, if the engine rotation speed Ne has not converged on the target engine rotation speed TNe1, the delta opening ΔAP, the upper limit acceleration Amax, and the target transmission gear ratio Tr4 are updated and the downshift control of the continuously variable transmission 13 is continued in the steps from step S21.

Accordingly, in the transition process from the stepped shift mode to the stepless shift mode, the continuously variable transmission 13 is controlled in accordance with the target transmission gear ratio Tr4, so that the shift rate when the continuously variable transmission 13 is downshifted is limited, and the rotational acceleration of the engine 12 is limited to the upper limit acceleration Amax or lower. Consequently, in the transition process to the stepless shift mode, a rapid increase in the engine rotation speed Ne can be avoided, thereby allowing for appropriate switching between the shift modes without giving a sense of discomfort to the vehicle occupant or occupants. In addition, since the upper limit acceleration Amax is set based on the delta opening ΔAP, if the accelerator pedal is pressed in the transition process, the engine rotation speed Ne can be quickly increased by increasing the shift rate, thereby appropriately responding to an acceleration request from the vehicle occupant.

[Switching Control to Stepless Shift Mode: Timing Chart]

Figure 12:
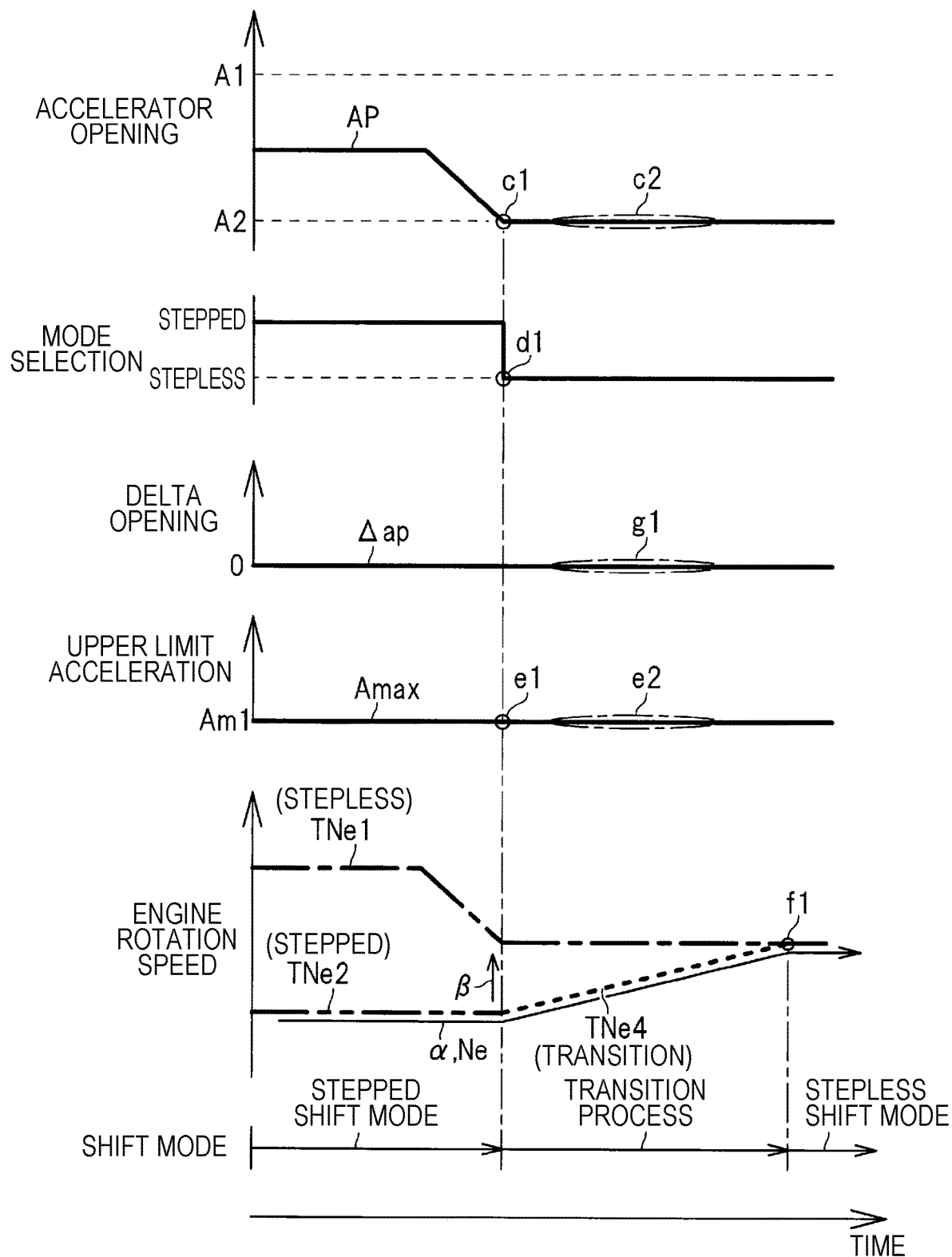
FIG. 12 is a timing chart illustrating an example of the process for switching the shift mode from the stepped shift mode to the stepless shift mode.
Figure 13:
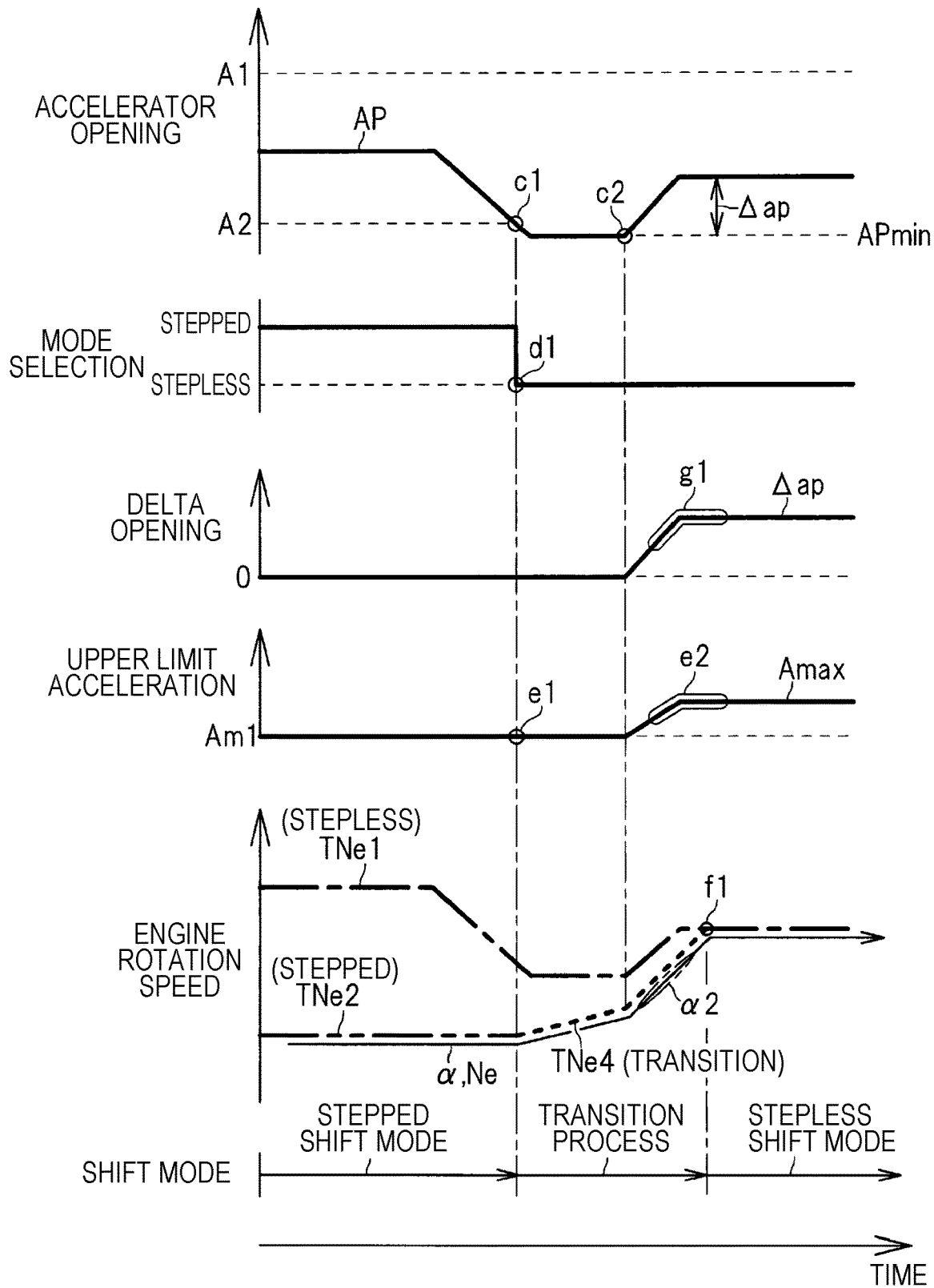
FIG. 13 is a timing chart illustrating another example of the process for switching the shift mode from the stepped shift mode to the stepless shift mode.
Figure 14:
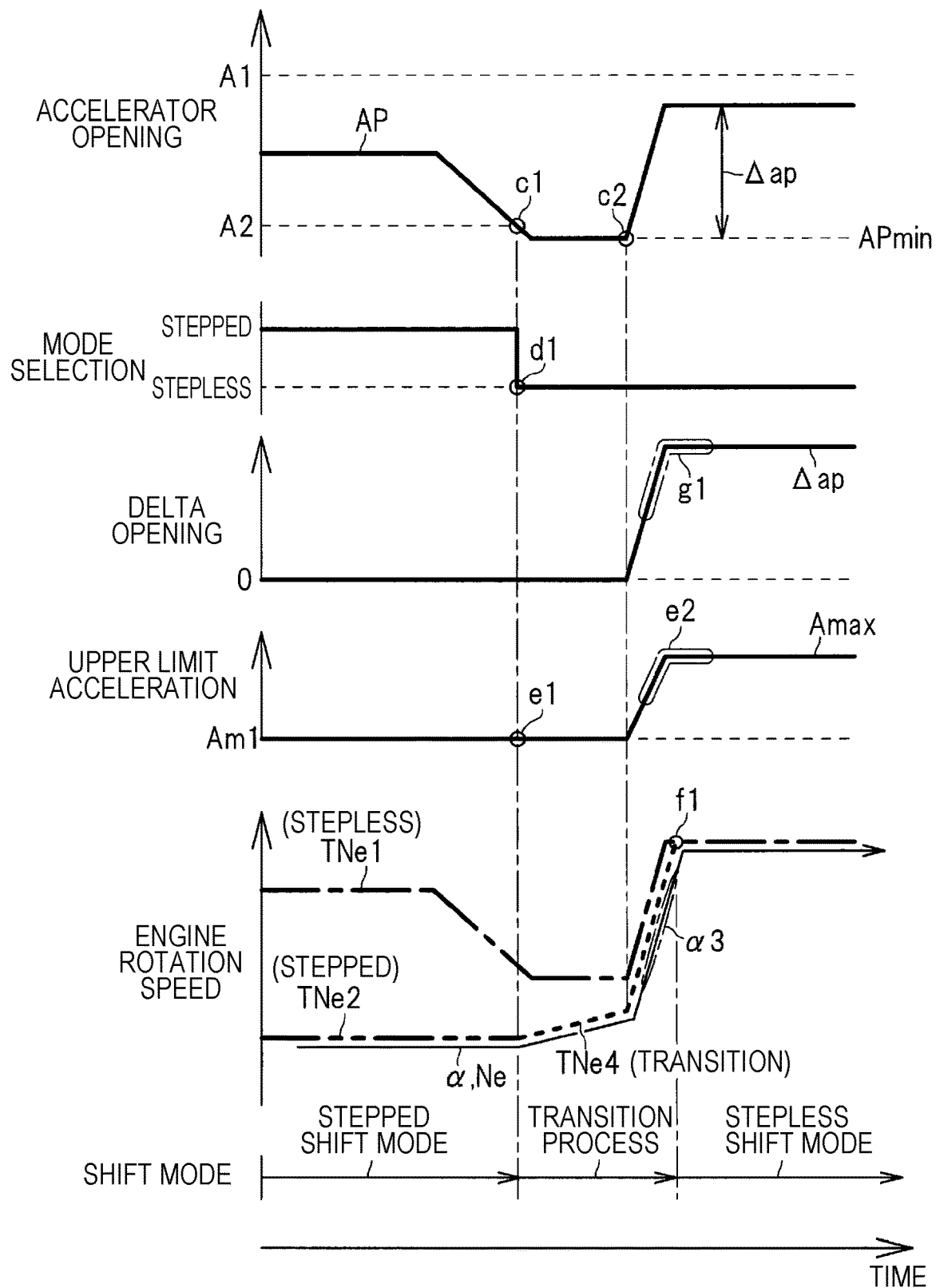
FIG. 14 is a timing chart illustrating another example of the process for switching the shift mode from the stepped shift mode to the stepless shift mode.

The switching process from the stepped shift mode to the stepless shift mode will be described below with reference to timing charts. FIG. 12 to FIG. 14 are timing charts each illustrating an example of the switching process from the stepped shift mode to the stepless shift mode. FIG. 12 illustrates a timing chart 1 in which the accelerator opening AP is kept near the opening threshold A2 after the accelerator opening AP falls below the opening threshold A2. FIG. 13 illustrates a timing chart 2 in which the accelerator opening AP increases slightly after the accelerator opening AP falls below the opening threshold A2. FIG. 14 illustrates a timing chart 3 in which the accelerator opening AP increases greatly after the accelerator opening AP falls below the opening threshold A2.

In FIG. 12 to FIG. 14, "TNe1" indicates the target engine rotation speed in the stepless shift mode, "TNe2" indicates the target engine rotation speed in the stepped shift mode, and "TNe4" indicates the target engine rotation speed in the transition process. In one example, as indicated by an arrow α in each of FIG. 12 to FIG. 14, when the shift mode is to be switched from the stepped shift mode to the stepless shift mode, the engine rotation speed Ne transitions along "TNe2" in the stepped shift mode, along "TNe4" in the transition process, and along "TNe1" in the stepless shift mode.

(Timing Chart 1)

As illustrated in FIG. 12, when the accelerator opening AP falls below the opening threshold A2 during the stepped shift mode (reference sign c1), switching from the stepped shift mode to the stepless shift mode is selected (reference sign d1). When this switching to the stepless shift mode is selected, the initial upper limit value Am1 is set as the upper limit acceleration Amax (reference sign e1). Then, in the transition process to the stepless shift mode, downshift control is executed while the shift rate is limited based on the upper limit acceleration Amax, and the rotational acceleration of the engine 12 is limited to the upper limit acceleration Amax or lower. By limiting the rotational acceleration of the engine 12 to the upper limit acceleration Amax or lower in this manner, the engine rotation speed Ne increases gently along the target engine rotation speed TNe4. Then, when the engine rotation speed Ne reaches the target engine rotation speed TNe1 (reference sign f1), the switching from the stepped shift mode to the stepless shift mode is completed.

Since the accelerator opening AP has not changed to increasing (reference sign c2) in the transition process from the stepped shift mode to the stepless shift mode, the delta opening ΔAP is kept at "0" (reference sign g1), and the upper limit acceleration Amax is kept at the initial upper limit value Am1 (reference sign e2). Therefore, the engine rotation speed Ne increasing in accordance with downshifting maintains a gently increasing curve in the transition process, as indicated by the arrow α. Accordingly, a rapid increase in the engine rotation speed Ne, as indicated by an arrow β, can be avoided, thereby allowing for appropriate switching between the shift modes without giving a sense of discomfort to the vehicle occupant or occupants.

(Timing Charts 2 and 3)

As illustrated in FIG. 13 and FIG. 14, when the accelerator opening AP falls below the opening threshold A2 during the stepped shift mode (reference sign c1), switching from the stepped shift mode to the stepless shift mode is selected (reference sign d1). When this switching to the stepless shift mode is selected, the initial upper limit value Am1 is set as the upper limit acceleration Amax (reference sign e1). In one example, before the minimum value APmin is detected in the transition process, the initial upper limit value Am1 is set as the upper limit acceleration Amax. Then, in the transition process to the stepless shift mode, downshift control of the continuously variable transmission 13 is executed while the shift rate is limited based on the upper limit acceleration Amax, and the rotational acceleration of the engine 12 is limited to the upper limit acceleration Amax or lower. By limiting the rotational acceleration of the engine 12 to the upper limit acceleration Amax or lower in this manner, the engine rotation speed Ne increases along the target engine rotation speed TNe4.

Since the accelerator pedal is pressed by the vehicle occupant and the accelerator opening AP has changed to increasing in the transition process to the stepless shift mode, the minimum value APmin of the accelerator opening AP is detected (reference sign c2). When the minimum value APmin is detected in the transition process in this manner, the delta opening ΔAP is calculated (reference sign g1) by subtracting the minimum value APmin from the accelerator opening AP, and the upper limit acceleration Amax is set based on the delta opening ΔAP (reference sign e2). In one example, after the minimum value APmin is detected in the transition process, upper limit acceleration that is higher than or equal to the initial upper limit value Am1 is set as the upper limit acceleration Amax based on the delta opening ΔAP. Therefore, the engine rotation speed Ne increasing in accordance with downshifting changes in the increasing rate in accordance with the delta opening ΔAP, that is, the upper limit acceleration Amax, as indicated by the arrow α. Then, when the engine rotation speed Ne reaches the target engine rotation speed TNe1 (reference sign f1), the switching from the stepped shift mode to the stepless shift mode is completed.

Since the upper limit acceleration Amax is set based on the delta opening ΔAP in this manner, if the accelerator pedal is pressed in the transition process, the engine rotation speed Ne can be quickly increased by increasing the shift rate, thereby appropriately responding to an acceleration request from the vehicle occupant. Furthermore, in the timing chart 3 illustrated in FIG. 14, the accelerator opening AP increases greatly, as compared with the timing chart 2 illustrated in FIG. 13, so that the upper limit acceleration Amax is set to a high value. Accordingly, in the timing chart 3 illustrated in FIG. 14, the increasing rate of the engine rotation speed Ne in the transition process can be increased (reference signs a2 and a3), as compared with the timing chart 2 illustrated in FIG. 13, thereby appropriately responding to an acceleration request from the vehicle occupant.

The disclosure is not limited to the above embodiment, and various modifications are possible within the scope of the disclosure. In the flowcharts illustrated in FIG. 9 and FIG. 10, the increasing rate of the engine rotation speed Ne, that is, the rotational acceleration of the engine 12, is limited to the upper limit acceleration Amax or lower until the engine rotation speed Ne converges on the target engine rotation speed TNe1. Alternatively, for example, if a predetermined time period elapses after the accelerator opening AP falls below the opening threshold A2, the limitation based on the upper limit acceleration Amax may be canceled even in a situation where the engine rotation speed Ne has not converged on the target engine rotation speed TNe1.

In the above description, the transmission controller 41 is provided with the stepless-transmission-gear-ratio setting unit 60, the stepped-transmission-gear-ratio setting unit 61, the designated-transmission-gear-ratio setting unit 62, the shift-mode selecting unit 63, the control signal generator 64, the upshift-threshold setting unit 65, the minimum value detector 66, the upper-limit-acceleration setting unit 67, and the transition-transmission-gear-ratio setting unit 68. Alternatively, for example, the setting units, the detector, the selecting unit, and the generator may be provided in another controller, or the setting units, the detector, the selecting unit, and the generator may be provided distributively in a plurality of controllers.

In the example illustrated in FIG. 4, seven fixed transmission gear ratios R1 to R7 are indicated as target transmission gear ratios to be used in the stepped shift mode. Alternatively, six or fewer fixed transmission gear ratios may be used, or eight or more fixed transmission gear ratios may be used. Furthermore, in the above description, the upshift threshold X1 is set based on the accelerator opening AP and the vehicle speed VSP. Alternatively, for example, the upshift threshold X1 may be set based on the accelerator opening AP alone, or the upshift threshold X1 may be set based on the vehicle speed VSP alone.

According to an embodiment of the disclosure, the upper limit value for the rotational acceleration of the engine is set based on the difference between the accelerator-pedal operated amount and the minimum value during the shift process of switching the shift mode from the stepped shift mode to the stepless shift mode. Furthermore, in the shift process of switching the shift mode from the stepped shift mode to the stepless shift mode, the shift rate when the continuously variable transmission is downshifted is limited, so that the rotational acceleration of the engine is limited to the upper limit value or lower. Consequently, this allows for appropriate switching between the shift modes.

The invention claimed is:

1. A shift control device having a stepless shift mode and a stepped shift mode as shift modes for controlling a continuously variable transmission to be coupled to an engine, the stepless shift mode being a mode in which a transmission gear ratio of the continuously variable transmission is controlled in a stepless fashion, the stepped shift mode being a mode in which the transmission gear ratio of the continuously variable transmission is controlled in a stepwise fashion, the shift control device comprising:
 a shift controller configured to switch the shift mode from the stepped shift mode to the stepless shift mode by executing shift control of the continuously variable transmission if an accelerator-pedal operated amount falls below a switch threshold during the stepped shift mode;
 a minimum value detector configured to detect a minimum value of the accelerator-pedal operated amount in a shift process of switching the shift mode from the stepped shift mode to the stepless shift mode; and
 an upper-limit-value setting unit configured to set an upper limit value for rotational acceleration of the engine based on a difference between the accelerator-pedal operated amount and the minimum value in the shift process of switching the shift mode from the stepped shift mode to the stepless shift mode,
 wherein, in the shift process of switching the shift mode from the stepped shift mode to the stepless shift mode, the shift controller limits the rotational acceleration of the engine to the upper limit value or lower by limiting a shift rate when the continuously variable transmission is downshifted.

2. The shift control device according to claim 1, wherein the upper-limit-value setting unit sets the upper limit value to a higher value as the difference increases.

3. The shift control device according to claim 2, wherein the minimum value is a value when the accelerator-pedal operated amount changes from decreasing to increasing.

4. The shift control device according to claim 3, wherein the upper-limit-value setting unit sets an initial upper limit value as the upper limit value before the minimum value is detected, and sets an upper limit value that is higher than or equal to the initial upper limit value as the upper limit value based on the difference after the minimum value is detected.

5. The shift control device according to claim 2, wherein the upper-limit-value setting unit sets an initial upper limit value as the upper limit value before the minimum value is detected, and sets an upper limit value that is higher than or equal to the initial upper limit value as the upper limit value based on the difference after the minimum value is detected.

6. The shift control device according to claim 1, wherein the minimum value is a value when the accelerator-pedal operated amount changes from decreasing to increasing.

7. The shift control device according to claim 6, wherein the upper-limit-value setting unit sets an initial upper limit value as the upper limit value before the minimum value is detected, and sets an upper limit value that is higher than or equal to the initial upper limit value as the upper limit value based on the difference after the minimum value is detected.

8. The shift control device according to claim 1, wherein the upper-limit-value setting unit sets an initial upper limit value as the upper limit value before the minimum value is detected, and sets an upper limit value that is higher than or equal to the initial upper limit value as the upper limit value based on the difference after the minimum value is detected.

* * * * *